June 9, 1964     S. G. HAYTER     3,136,597
RECORDING INSTRUMENT

Filed March 24, 1961

3,136,597
RECORDING INSTRUMENT

Stanley G. Hayter, Bloomfield, N.J., assignor to Westinghouse Electric Corporation, East Pittsburgh, Pa., a corporation of Pennsylvania
Filed Mar. 24, 1961, Ser. No. 98,136
1 Claim. (Cl. 346—140)

This invention relates generally to recording instruments and more particularly to the type of recording instruments utilizing a sealed inking system.

Recording instruments, such as the type shown, described, and claimed in copending application Serial No. 767,911, filed October 17, 1958 by me and Dennis F. Roerty and assigned to the same assignee as is this application, now abandoned; are often used in locations wherein the temperature is considerably below a normal room temperature of 70 degrees Fahrenheit and in locations in which the temperature may be in subzero. It has been found that at these low temperatures the ink supplying tubing tends to stiffen thereby causing calibration errors which of course seriously reduce if not completely destroy the usefulness of the instrument. In the prior art systems, a heater requiring in the neighborhood of 125 watts has been employed to heat the inside of the recorder housing. For many applications such an arrangement has been quite satisfactory but for other applications the wattage required is objectionable and is especially objectionable when the instrument is energized by the potential being measured.

It is therefore a prime purpose of this invention to provide a new heater for the tubing having a lower wattage requirement.

A further object of this invention is to provide a heater which requires a lesser amount of power and therefore places a reduced burden on the network being measured.

A further object is to utilize the tubing supporting spring as the heater.

Further objects will be apparent from the specification, the appended claims and the drawings, in which:

Figure 1:
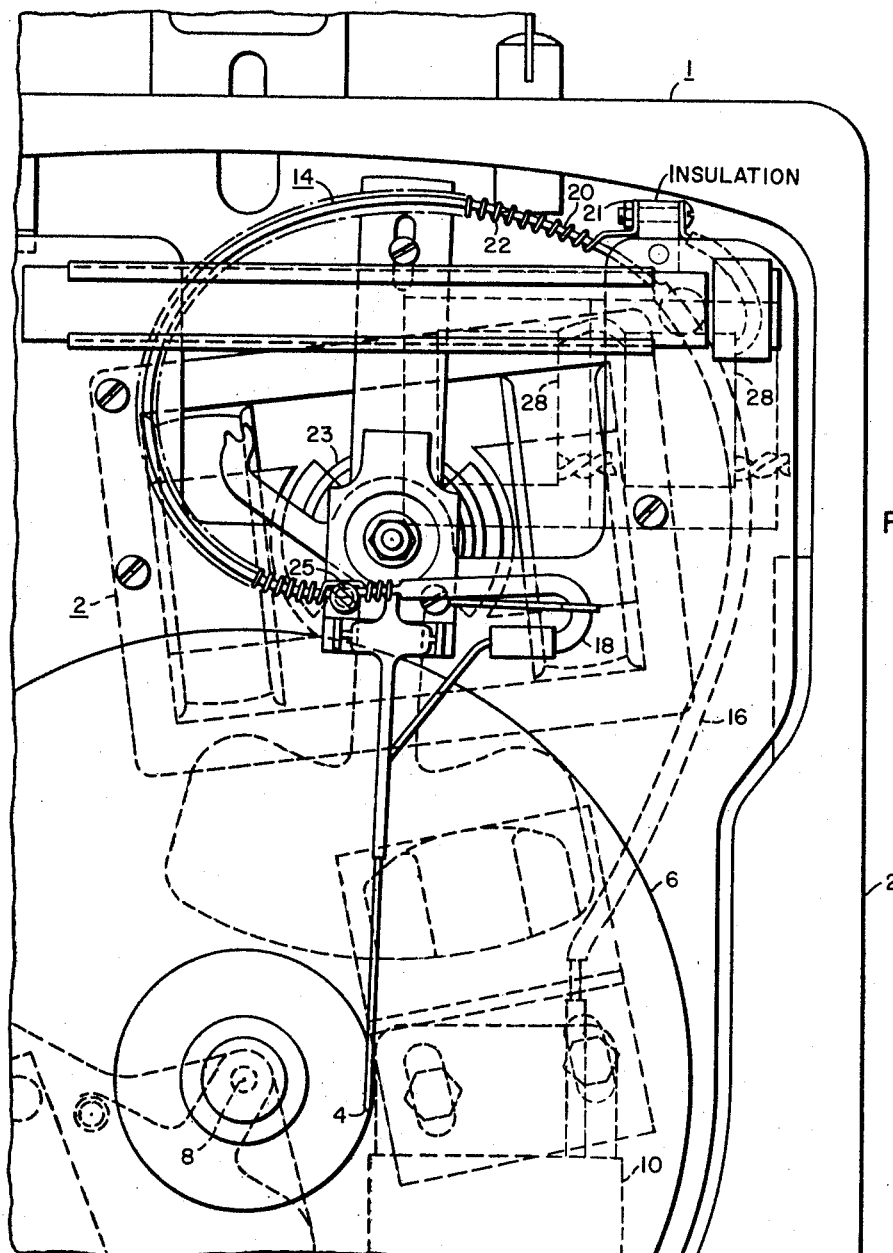
FIGURE 1 illustrates a recording instrument embodying the invention.
Figure 2:
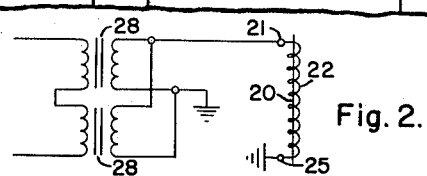
FIG. 2 is a schematic view illustrating the electrical heating circuit.

Referring to the drawing by characters of reference, the numeral 1 designates generally a recording instrument such as a recording voltmeter having a voltage sensisive element 2 which positions an inking pen 4 radially of a calibrated chart 6 which rotates about its center 8 by suitable means such as a synchronous electric motor. An ink reservoir 10 is carried rearwardly of the instrument face and may be in the form of a plastic sac. An ink supplying tube 14 leads from the sac or reservoir 10 to the pen 4. The tube 14 is provided with portions 16 and 18 of normal diameter which portions do not flex during normal operation of the instrument. The flexing is done by an intermediate portion 20 between the stationary portion 16 and the portion 18 which is stationary with respect to the pen 4 but movable with respect to the portion 16. The portion 20 is of reduced wall thickness and cross sectional area to provide an extremely flexible portion and is more fully described and claimed in the said copending application.

As set forth therein the tube 14 may be a Saran plastic composed of vinylidene chloride copolymers having a bore diameter of approximately .028 inch in a wall thickness of .011 inch. The flexible intermediate portion 20 is formed of heating and stretching to provide a bore diameter of .018 to .024 inch and a wall thickness of .004 inch. This stretching portion 20 is very flexible and at the same time has a low permeability which prevents air from becoming entrained in the ink. The portion 20 is supported by a helical spring 22 having one end portion secured to a fixedly located terminal 21 which is insulated from the remainder of the recorder parts. The other end portion is secured as by the screw 25 for movement with the pen 4. The screw 25 is connected through the spring 23 to the stationary recorded structure. The spring 22 surrounds the tubing portion 20 and guides and positions it to insure that it flexes in a consistent and repetitious manner upon repetitious movement of the pen 4. With this arrangement, the pen 4 will have a predetermined position on the chart for each degree of energization of the voltage or current sensitive pen actuating element 2 whereby the chart will be marked to produce an accurate record of the electrical quantity to which the element 2 is connected.

At lower than normal and especially at subfreezing temperatures, the plastic tubing tends to become less flexible thereby placing a greater resistance to movement on the pen 4, even though low temperature ink is used and the ink itself is sufficiently fluid. As may be appreciated, this variation in flexibility tends to retard the pen movement whereby the pen 4 will tend to undermove in response to increasing and decreasing magnitudes of the electrical quantity being measured. In the case of a voltage measurement, this causes an undervoltage indication in a voltage increasing direction and an overvoltage indication in a voltage decreasing direction.

To overcome this error it has been the practice in the past to place an electric heater in the recorder casing 24. This practice is inefficient in that much of the heat is wasted through the casing 24 and in otherwise heating parts which do not need to be heated. In accordance with the teachings of this invention the heat is applied directly to the critical location which is the flexible portion 20 of the tube 14.

In accordance with the invention the spring 22 is made of a suitable material such as Phosphor bronze and is electrically energized. While it may be supplied with power in many ways it is preferably energized from the secondary windings of transformers 28 having their primary windings connected in parallel or in series depending upon the magnitude of the applied voltage. In accordance with the teachings of this invention and in instances when the recorder is to be voltage responsive, the primary windings may be connected to the same source as is the element 2. If .0179 inch diameter Phosphor bronze spring wire is used and coiled into a spring having an internal diameter of .080 inch and a length of about 7 inches, it will have a resistance of about 3 ohms. This will provide a current of between 1.5 and 2.5 amperes. This current will provide sufficient heat to maintain the necked-down Saran ink feed tubing sufficiently flexible so that the recorder will maintain its calibration and will operate satisfactorily.

The current for the heater spring or coil 22, which nominally is 2 amperes, may be obtained from the secondary windings of the transformer 28 and the power drawn will not be a burden on the circuit being measured. While a single transformer, of the proper current and voltage ratings may be connected between the terminal 21 and the recorder structure to energize the heater 22, in the more specific aspect of the invention, I prefer to use two commercially available filament transformers each having a 110 volt primary winding and a 6.3 volt secondary winding rated at 1 ampere. With this arrangement the secondary windings may be connected in parallel to provide the required current at 6.3 volts while the primary windings may be connected in parallel or series depending upon the voltage (110 or 220) being supplied to the recorder element. The use of two transformers lends itself to the space available in recorders of the type described better than a larger single transformer.

While the invention has been described as being embodied in a potential measuring recorder and it is particularly advantageous when so used, it is to be distinctly understood that it may be used in other types of recorders such as ampere and wattage recorders and it is desired to cover all modifications falling within the scope of the invention.

I claim as my invention:

An apparatus comprising a reservoir adapted to contain a quantity of ink, a pen movable relative to said reservoir, means communicatively connecting said reservoir with said pen and including a fluid conveying tube, said tube being provided with a flexing portion, said portion being of such flexibility that it is incapable of supporting itself, an elongated flexible electrical conducting member supporting and holding said flexing portion for movement in a predetermined path as a consequence of movement of said pen relative to said reservoir, and means for passing current substantially throughout the length of the portion of said conducting member which supports said flexed portion to raise the temperature thereof above ambient temperature.

References Cited in the file of this patent

UNITED STATES PATENTS

| | | |
|---|---|---|
| 2,820,689 | Holloway | Jan. 21, 1958 |
| 2,976,109 | Hayter | Mar. 21, 1961 |

FOREIGN PATENTS

| | | |
|---|---|---|
| 455,934 | Great Britain | Oct. 30, 1936 |